United States Patent [19]

Gomez et al.

[11] Patent Number: 4,513,329
[45] Date of Patent: Apr. 23, 1985

[54] MANCHESTER DECODER CLOCK MULTIPLIER

[75] Inventors: Aldan D. Gomez, El Cajon; Edward W. Gennetten, San Diego, both of Calif.

[73] Assignee: The United States of America as represented by the Secretary of the Navy, Washington, D.C.

[21] Appl. No.: 528,386

[22] Filed: Sep. 1, 1983

[51] Int. Cl.³ .............................................. G11B 5/09
[52] U.S. Cl. ........................................ 360/42; 360/51
[58] Field of Search ...................... 360/42, 51; 375/23

[56] References Cited

U.S. PATENT DOCUMENTS 3,949,394 4/1976 Kennedy .............................. 360/42

Primary Examiner—Vincent P. Canney
Attorney, Agent, or Firm—Robert F. Beers; Ervin F. Johnston; Edmund W. Rusche, Jr.

[57] ABSTRACT

The circuit comprises a differentiator, two nonretriggerable-gated-monostable-multivibrators, a clock decoder, a data flip-flop unit, and a multiphase and frequency logic circuit. The differentiator checks the incoming Manchester encoded signal and divides it into two trigger signals one with data associated with logic "0" transitions within the Manchester signal and the second trigger signal containing data associated with logic "1" transitions within the Manchester data. One trigger signal is fed to one of the nonretriggerable-gated-monostable-multivibrator and the other trigger signal is transmitted to the second similar unit. Within these monostable multivibrator units the signals are gated and delayed by a tapped delay line which outputs a plurality of delayed signals which have waveforms built upon the occurrence of transitions within the Manchester signal associated with the logic "0" and logic "1" occurrences. Also within the monostable multivibrator, a set/reset latch is utilized to create appropriate signals to aid the control gates in blocking out undesired portions of the input trigger signals from the differentiator. The outputs of the set/reset latches are then fed to a clock decoder and onto a data flip-flop unit which is used to retrieve the data signals from the Manchester encoded signal. Outputs from the tapped delay lines within each monostable multivibrator which emit a plurality of delayed signals are fed to a multiphase and frequency logic unit which combines these delayed signals in predetermined manners to create a multiplicity of clock signals differing in frequency and phase.

12 Claims, 3 Drawing Figures

MANCHESTER DECODER CLOCK MULTIPLIER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Conventional Manchester decoders generally provide data and a single clock frequency as outputs. The Manchester code is used to couple data and clock signals between electronic circuits spaced physically apart. Its use is widespread and increasing.

A Manchester code consists of two serial signals, data and clock, which are combined through an exclusive OR gate to produce a single encoded signal. A conventional Manchester decoder separates the encoded signal into data and clock information. The decoded clock frequency is a single clock of the same clock frequency used in generating the data before encoding occurs, which is also the same clock frequency used to generate the Manchester code. Most Manchester decoder designs are limited to a single clock frequency at the decoder output.

SUMMARY OF THE INVENTION

The purpose of this invention is to present a Manchester decoder circuit which provides a multiplicity of clocks of multiple frequencies and with controlled phase relationships. The invention is referred to as the MANCHESTER DECODER CLOCK MULTIPLIER (MDCM). The MDCM provides a broadened capability of use of Manchester codes wherein an increase in system capability to process information is gained by having extra clocks having frequency multiples of two or more and having controlled phase relationships.

The MDCM is constructed of a differentiator which receives the incoming Manchester encoded signal and divides it into separate signals feeding separate nonretriggerable-gated-monostable-multivibrators. The outputs of the monostable multivibrators are combined to feed a clock decoder circuit which connects to control a D-type flip-flop circuit. The clock decoder circuit and D-type flip-flop circuit are an established means for decoding the Manchester encoded data and clock signal. Also included in each nonretriggerable-gated-monostable-multivibrator are separate tapped delay lines where preset delayed signals referenced to the standard clock signal are drawn and fed to a multiphase and frequency logic circuit. The multiphase and frequency logic circuit combines the delayed signals into a multiplicity of preselected clock frequencies with preselected phase relationships.

OBJECTS OF THE INVENTION

An object of this invention is to provide a Manchester decoder which outputs a multiplicity of clocks at multiple frequencies.

A second object of the invention is to present a Manchester decoder which outputs a multiplicity of clocks at controlled phase relationships.

A further object of the invention is to present a Manchester decoder clock multiplier which provides a multiplicity of clocks with both multiple frequencies and with controlled phase relationships.

Other objects, advantages and novel features of the invention will become apparent from the following detailed description of the invention when considered in conjunction with the accompanying drawings.

DESCRIPTION OF THE PREFERRED EMBODIMENT

In this invention, the Manchester decoder clock multiplier (MDCM) takes a conventionally encoded signal and decodes it into data and a multiplicity of clocks. In this multiplicity of clocks there is one clock frequency which shall be referred to as the baseline clock; it is that clock which is decoded in a conventional Manchester decoder. This clock ideally defines the boundary of a data bit period (T in FIG. 1) and is aligned in time with the clocking edge of the baseline clock signal.

Figure 1:
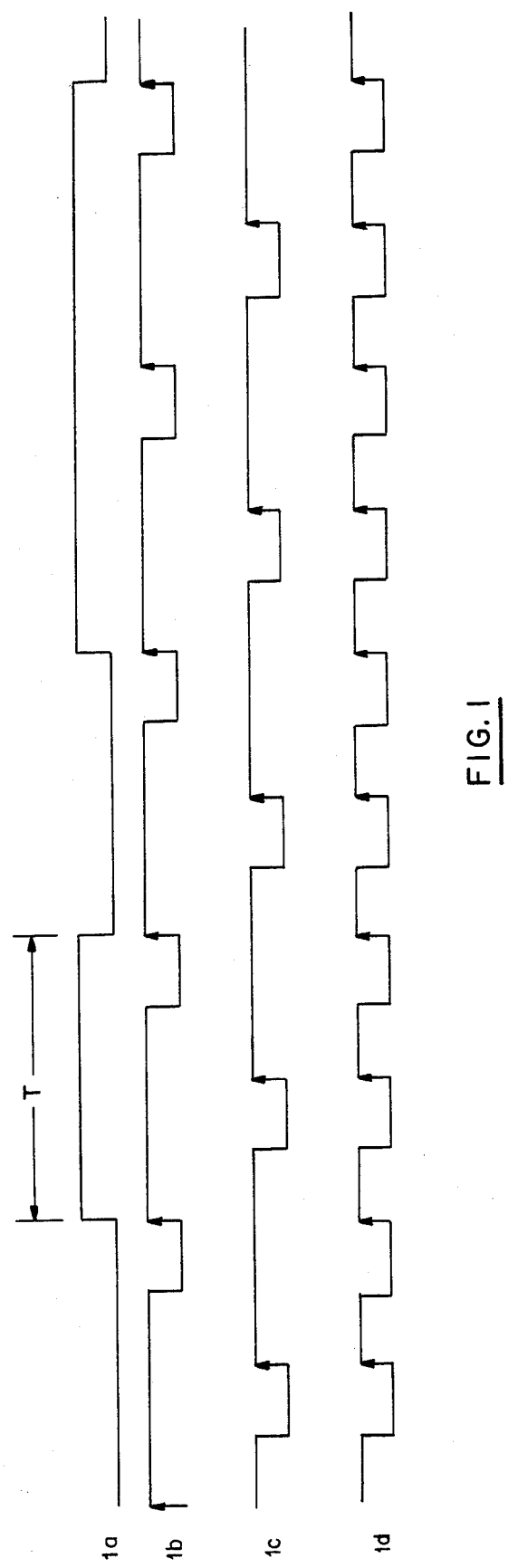
FIG. 1 presents four waveforms which show in a general way the output of a Manchester decoder and the output of the invented Manchester decoder clock multiplier.

In FIG. 1, waveform 1a represents decoded data. Waveform 1b represents a typical baseline clock signal wherein the clocking edges are denoted by arrows in the waveform. Waveform 1c shows a second clock signal of different phase than the baseline clock signal of waveform 1b. Waveform 1d shows a clock signal of a frequency higher than the baseline clock waveform 1b. The higher frequency clock, shown as waveform 1d, can be obtained by combining through a logical AND operation the phased clock waveforms 1b and 1c. The depiction of these waveforms are presented to simply illustrate the concept incorporated in this invention. Waveforms 1c and 1d are examples of the multiplicity of possible clock waveforms that can be output with different frequencies and phase relationships.

The clocking edge as denoted in FIG. 1 is identified by arrows. Typically, the data is delayed in time relative to the clock edge by an amount determined by the propagation of the switching elements within the clocked device. For clarity of disclosure all waveforms have herein been illustrated in idealized form, i.e. showing no time delay between equivalent clocking edges in the different waveforms. However, it should be understood that the propagation delay of real world logic devices must be taken into consideration in any reduction to practice of the MDCM.

Figure 2:
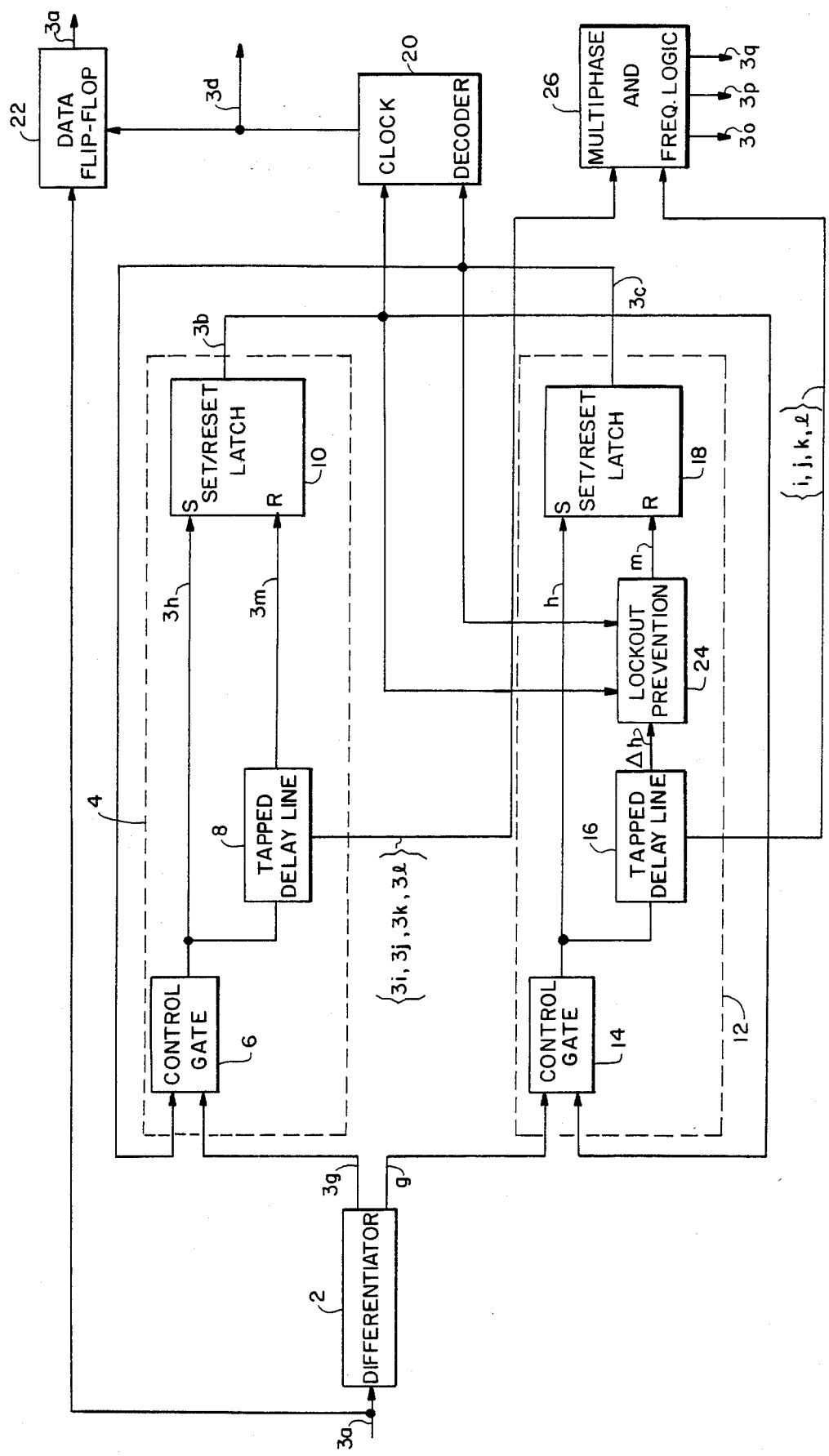
FIG. 2 shows a schematic of the circuit layout for the Manchester decoder clock multiplier.
Figure 3:
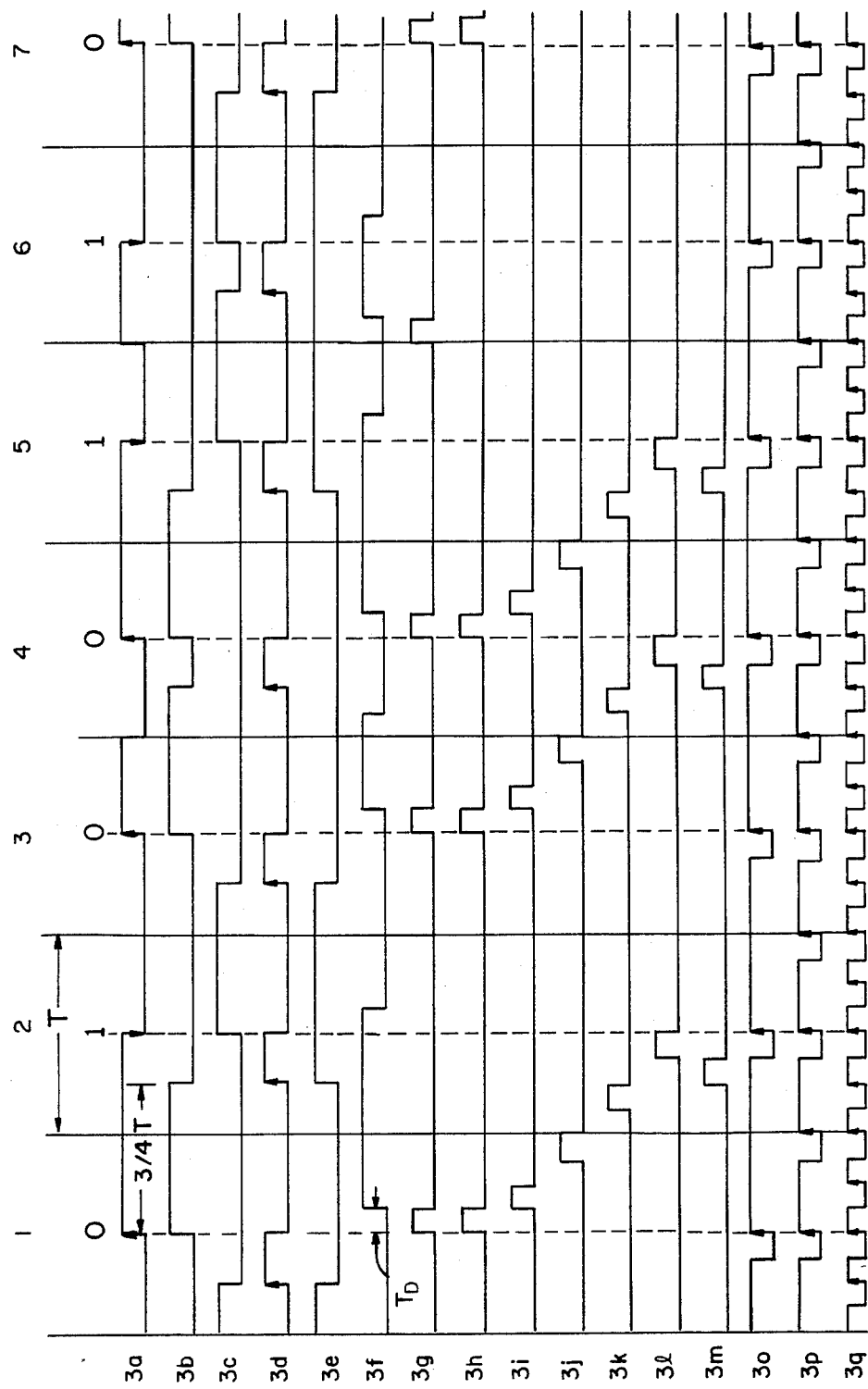
FIG. 3 shows waveforms that occur at various points in the circuit depicted in FIG. 2.

FIG. 2 shows the principal component pats of the MDCM, and also shows locations within the circuit where the waveforms presented in FIG. 3 occur. As shown in FIG. 2, the MDCM comprises a differentiator 2, a first nonretriggerable-gated-monostable-multivibrator 4, a second retriggerable-gated-monostable-multivibrator 12, a clock decoder circuit 20, a data flip-flop 22, and a multiphase and frequency logic unit 26. The first nonretriggerable-gated-monostable-multivibrator 4 is composed of components including a control gate 6, a tapped delay line 8, and a set/reset latch 10. The second nonretriggerable-gated-monostable-multivibrator 12 includes a control gate 14, a tapped delay line 16, a lockout prevention unit 24, and a set/reset latch 18. It is to be understood that within the following description lockout prevention unit 24 may alternatively be placed within the monostable multivibrator circuit 4.

FIG. 3 shows several waveforms which occur at points within the circuit of the MCDM. These waveforms will be referred to and discussed in the following description of the preferred embodiment associated with FIG. 2. A specific point to note in regard to the depicted form for waveform 3a is to recognize that this representation of an encoded Manchester signal shows a data logic "0" as a positive transition within a data bit period and a data logic "1" as a negative transition. Clearly, the opposite format is equally acceptable and to be considered within the scope of this invention. Waveform 3a represents the input signal of the encoded data and clock in the form of a Manchester code. The differentiator 2 receives this input signal, divides it, and produces two trigger signals. One trigger signal is a response to positive transitions in the Manchester signal 3a and the other is a response to the negative transitions in signal 3a. The trigger signal responsive to positive transitions, waveform 3g, is responsive to the positive edge transitions. The logic relation for creating trigger signal waveform 3g within differentiator 2 is defined by the equation $$3g = 3a \cdot \overline{3f}$$

where signal 3f is Manchester code 3a delayed by some preselected time $T_D$ and complemented. In FIG. 3, $T_D = \frac{1}{4}T$. The symbol carries the usual meaning of a logical AND operation, and the bar over 3f identifies the compliment operation on 3f.

It is noted that trigger signal 3g takes the form of a pulse of pulse width $T_D$. This trigger signal assertion occurs for two cases. In one case, the positive transitions are in the middle of the bit period T and are related to the encoded logic zeros in the Manchester signal 3a. In the other case, the positive transitions are at the bit period boundary between two successive encoded logic ones as shown in waveform 3a of FIG. 3. Waveform 3a is shown to encompass six complete periods T and a part of the seventh period. Data logic "0" instructions are represented in periods 1, 3, 4 and 7 while data logic "1" instructions are contained in periods 2, 5 and 6. In addition, between periods 5 and 6 of waveform 3a, an example of a positive transition that occurs at a bit period boundary between two successive encoded logic ones is shown.

The second trigger signal created by differentiator 2 is identified by the symbol g on the output connector from differentiator 2. This trigger signal, which does not have a waveform shown in any figure presented herein, is similar in nature to trigger signal 3g, but exhibits its assertion on transitions associated with encoded logic ones in the Manchester signal and, also, in the case of the occurrence of a negative transition at a bit period boundary between two successive encoded logic zeros. Signal 3g is fed to control gate 6 contained within monostable multivibrator 4 and signal g is fed to control gate 14 located within monostable multivibrator 12.

The monostable multivibrator 4 serves a basic purpose for detecting zeros in the Manchester code. Control gate 6 receives two input waveforms. One waveform is 3g from differentiator 2 and the second waveform is a waveform 3c which is output from monostable multivibrator 12. The output of control gate 6 is the set signal of waveform 3h defined by the equation, $$3h = 3c \cdot 3g.$$

It is seen from FIG. 3 that control gate 6 modifies waveform 3g through the use of waveform 3c to effectively remove assertions that have occurred in 3g at bit period boundaries between two successive encoded logic ones. Waveform 3h now contains only assertions at the occurrence of positive transitions corresponding to true encoded logic zeros in the Manchester signal 3a.

Signal 3h is fed directly into a set input of set/reset latch 10, and is also simultaneously split and fed through tapped delay line 8. Within the tapped delay line 8 signal 3h is selectively delayed to create a multiple of different waveforms. One such delayed waveform 3m has been delayed by $\frac{3}{4}T$. This waveform is then fed to a reset input of set/reset latch 10. Other delayed outputs from tapped delay line 8, e.g. waveforms 3i, 3j, 3k, and 3l, are transmitted directly to multiphase and frequency logic unit 26.

The set/reset latch 10, under the action of the setting signal 3h and resetting signal 3m, outputs a waveform 3b. 3b is seen to carry assertions with pulse width $\frac{3}{4}T$ which start at the clocking edge of the data logic "0" transition and end $\frac{3}{4}T$ later. Waveform 3b is then transmitted to input control gate 14 simultaneously with waveform g.

Control gate 14 is located within monostable multivibrator 12 where detection of data logic "1" signals within the input Manchester signal 3a occur. Control gate 14 uses signal 3b to help block out any assertions in signal g which are undesired assertions caused by bit period boundaries between two successive encoded logic zeros. This process is similar to the process occurring in control gate 6 where signal 3c is used to help block assertions in 3g that have been caused by bit period boundary anomolies between two successive encoded logic ones. The output signal from control gate 14 is identified as h which is a signal with pulse assertions similar in nature to waveform 3h but constructed to focus on the existence of the occurrence of logic ones in the Manchester signal 3a.

As in monostable multivibrator 4 signal h is split with a clean form going as the set signal to set/reset latch 18 and a split-off signal going into tapped delay line 16. Within tapped delay line 16 select delays are similarly applied to signal h has occurred in tapped delay line 8 for signal 3h. Again a particular delay of $\frac{3}{4}T$ is applied to create a signal m output from the tapped delay line which is input as a reset signal to the set/reset latch 18. Set/reset latch 18 under the control of the setting signal h and resetting signal m outputs waveform 3c which is fed back as one input to control gate 6, as discussed earlier. A similarly select multiplicity of different delayed waveforms, e.g. i, j, k, and l, are output from tapped delay line 16 and transmitted as a second input to multiphase and frequency logic unit 26.

A lockout prevention unit 24 may be inserted between tapped delay line 16 and set/reset latch 18, or in the alternative inserted between tapped delay line 8 and set/reset latch 10. Lockout prevention unit 24, as shown in FIG. 2, receives an input from tapped delay line 16, an input of waveform 3b and an input of waveform 3c. The lockout prevention unit 24 prevents the possible lockup of the MDCD during a power transient or other such abnormal disturbance. Normally, two monostable multivibrator outputs (3b, 3c) will be logic (0,0), (0, 1) or (1, 0), and not (1, 1). If outputs 3b and 3c are both logic "1", lockout prevention unit 24 forces the reset signal m to logic "1" and hence, monostable multivibrator 12 output 3c will be negated breaking the deadlock. Therefore signal m can be more appropriately represented by the equation $$m = 3b \cdot 3c + \Delta h$$

where $\Delta h$ means signal h delay, here by $\frac{3}{4}T$, and the + operation is the logical OR.

Waveforms associated with the logic "1" detecting monostable vibrating unit 12 have been identified simply by the letters g, h, m, i, j, k, and l. These waveforms are not shown in a figure similar to FIG. 3 but are further defined here briefly as follows, $$g = 3a + 3f$$

where g is asserted for time $T_D$ following the two types of negative edge transitions occurring in a Manchester signal of waveform 3a. The control gate 14 output h is defined by $$h = 3b \cdot g.$$

Clock circuit signals 3b and 3c are fed to decode clock unit 20 which combines them to create a standard baseline clock waveform 3d in accordance with the equation $3d = 3b \cdot 3c$. A data flip-flop unit 22 receives inputs of the conventional Manchester signal 3a and of baseline clock waveform 3d from clock decoder 20 wherein signal 3a is synchronized to allow the stripping out of the data which when output as a waveform 3e contains the data stored in the encoded Manchester signal.

The multiphase and frequency logic unit 26 generates clocks having frequencies that are multiples of the baseline clock waveform 3d and clocks that are phased in relation to the baseline clock 3d. Inputs to the multiphase and frequency logic unit 26 are delay line outputs 3i, 3j, 3k, and 3l from tapped delay line 8, and a corresponding set of outputs i, j, k, l, not illustrated, from tapped delay line 16. The delay line outputs 3i, 3j, 3k, and 3l are signals created from waveform 3h by preselected delays. The delay outputs i, j, k, and l are signals created from signal h by preselected delays.

In FIG. 3, examples are shown of delay outputs 3i, 3j, 3k, 3l, i, j, k and l combined to produce the times two frequency clock waveform 3p and the times four frequency clock waveform 3q as well as the signal phased clock waveform 3o. These are shown with the clock edge common in time lined up with the logic "1" and "0" defining transitions in the center of the Manchester signal 3a. Any other such phased relationship so desired can be obtained by merely selecting the appropriate outputs from tapped delay lines 8 and 16. Consequently, it can be written $$3o = 3l + l$$

$$3p = 3j + 3l + j + l$$

$$3q = 3i + 3j + 3k + 3l + i + j + k + l.$$

Only one single phase clock waveform 3o is shown in FIG. 3. However, other phases can be derived by selecting appropriate delays. For example, another clock like 3o but delayed $\frac{1}{2}T$ would provide the user with a two-phased clock system. The number of phases and multiple frequencies available will depend on the baseline clock frequency, the upper frequency limit of logic family used, and/or the clock pulse width specification of the logic family used. The MDCM can be used to develop any reasonable clock multiple of the baseline frequency.

Obviously many modifications and variations of the present invention are possible in the light of the above teachings. It is therefore to be understood that within the scope of the appended claims the invention may be practiced otherwise than as specifically described.

What is claimed is:

1. A Manchester decoder clock multiplier which comprises:

means, disposed to receive an incoming conventionally encoded Manchester signal, for differentiating between positive voltage transitions and negative voltage transitions in the Manchester encoded signal, said differentiating means emitting separate trigger signals wherein the first trigger signal contains assertions of a predetermined pulse width associated with voltage transitions that correspond to data logic "0"'s within the conventionally encoded Manchester signal, and the second trigger signal contains assertions of a predetermined pulse width associated with voltage transitions corresponding to data logic "1"'s contained within the conventionally encoded Manchester signal;

first means, connected to receive the first trigger signal output from the differentiating means, for detecting and passing a signal waveform containing only those assertions in the first trigger signal that are associated with logic "0"'s within the Manchester signal, said first detecting means also selectively delaying and providing for output of a plurality of delayed waveforms from the passed signal waveform;

second means, connected to receive the second trigger signal output from the differentiating means, for detecting and passing a signal waveform containing only those assertions in the second trigger signal that are associated with logic "1"'s within the Manchester signal, said second detecting means also selectively delaying and providing for output of a plurality of delayed waveforms from the passed signal waveform;

means, connected to the first and second detecting means, for establishing a decoded clock signal by combining a select output signal from each of the first and second detecting means;

means, disposed to receive the incoming conventionally encoded Manchester signal and connected to the output of the establishing means, for decoding the Manchester signal to reveal the data which was encoded in the Manchester signal; and means, connected to receive the plurality of delayed signals from both the first and second detecting means, for constructing a plurality of predetermined clock waveforms which differ in phase and frequency.

2. A clock multiplier according to claim 1 wherein the first detecting means further comprises:

means, connected to receive the first trigger signal output from the differentiating means and connected to receive a special signal output from the second detecting means, for controllably gating out erroneous assertions in the first trigger signal which are not associated with logic "0" type transitions in the Manchester signal;

means, connected to the output of the gating means, for delaying the gated signal over a plurality of preselected time delays, said delaying means being fitted with outputs for making the delayed signals selectively available to other circuits; and means, connected to the output of the gating means and connected to a predetermined output of the delaying means, for creating a special signal for output to the second detecting means which is asserted over a preselected time interval following the occurrence of a logic "0" type transition within the incoming Manchester signal.

3. A clock multiplier according to claim 2 wherein the second detecting means further comprises:

means, connected to receive the second trigger signal output from the differentiating means and connected to receive the special signal output from the first detecting means, for controllably gating out erroneous assertions in the second trigger signal which are not associated with logic "1" type transitions in the Manchester signal;

means, connected to the output of the gating means, for delaying the gated signal over a plurality of preselected time delays, said delaying means being fitted with outputs for making the delayed signals selectively available to other circuits; and means, connected to the output of the gating means and connected to a predetermined output of the delaying means, for creating a special signal for output to the first detecting means which is asserted over a preselected time interval following the occurrence of a logic "1" type transition in the incoming Manchester signal.

4. A clock multiplier according to claim 3 wherein the means for controllably gating comprises:
a controlled gate circuit.

5. A clock multiplier according to claim 4 wherein the means for delaying comprises:
a tapped delay line.

6. A clock multiplier according to claim 5 wherein the means for creating comprises:
a set/reset latch circuit.

7. A clock multiplier according to claim 6 wherein the means for establishing comprises:
a clock decoder circuit.

8. A clock multiplier according to claim 7 wherein the means for decoding comprises:
a D-type flip-flop circuit.

9. A clock multiplier according to claim 8 wherein the means for constructing comprises:
a multiphase and frequency logic circuit.

10. A clock multiplier according to claim 9 wherein the first detecting means further comprises:

means connected between the output of the delaying means and the input of the creating means, and also connected separately to the outputs of the creating means for both the first and second detecting means, for preventing lockup of the Manchester decoding clock multiplier circuit during an abnormal disturbance to the decoding circuit.

11. A clock multiplier according to claim 9 wherein the second detecting means further comprises:

means, connected between the output of the delaying means and the input of the creating means, and also connected separately to the outputs of the creating means of both the first and second detecting means, for preventing lockup of the Manchester decoding clock multiplier circuit during an abnormal disturbance to the decoding circuit.

12. A Manchester decoder clock multiplier which comprises:

means, disposed to receive an incoming conventionally encoded Manchester signal containing data bit periods of time length T, for differentiating between transitions with the Manchester code that are associated with logic "0" data and transitions associated with logic "1" data, said differentiating means emitting separate trigger signals wherein the first trigger signal contains assertions of a pulse width $\frac{1}{8}$T associated with transitions corresponding to logic "0" data, and the second trigger signal contains assertions of a pulse width $\frac{1}{8}$T associated with the logic "1" data;

first means, connected to receive the first trigger signal output from the differentiating means and connected to receive a waveform signal with an assertion of pulse width $\frac{3}{4}$T which is associated with logic "1" type transitions within the Manchester signal, for controllably gating out erroneous assertions in the first trigger signal that are associated with logic "1" type transitions in the Manchester signal, said gating means outputting a waveform signal with assertions of pulse width $\frac{1}{8}$T that only occur at transitions corresponding to logic "0" events in the Manchester signal;

first means, connected to the output of said first gating means, for delaying the gated signal over a plurality of preselected time delays said delaying means being fitted with outputs for making the delayed signals selectively available to other circuits;

means, connected to the output of said first gating means and connected to an output of said first delaying means which transmits a delayed waveform signal of pulse width $\frac{1}{8}$T but delayed a period $\frac{3}{4}$T, for creating a signal for output to a second gating means, said signal being asserted over a pulse width $\frac{3}{4}$T that immediately follows the occurrence of a logic "0" type transition in the incoming Manchester signal;

second means, connected to receive the second trigger signal output from the differentiating means and connected to receive the output signal from the first creating means, for controllably gating out erroneous assertions in the second trigger signal which are associated with logic "0" type transitions in the Manchester signal;

second means, connected to the output of said second gating means, for delaying the gated signal over a plurality of preselected time delays, said delaying means being fitted with outputs for making the delayed signals selectively available to other circuits;

second means, connected to the output of said second gating means and connected to an output of said second delaying means which causes a $\frac{3}{4}$T delay to the gating means signal, for creating a signal for output to the input of the first gating means, said signal being asserted for a time interval $\frac{3}{4}$T following the occurrence of a logic "0" type transition in the incoming Manchester signal;

means, connected to the output of the first and second creating means, for establishing a decoded clock signal by combining the output signals from each of the first and second creating means;

means, disposed to receive the incoming conventionally encoded Manchester signal and connected to the output of the establishing means, for decoding the Manchester signal to reveal the data which was encoded in the Manchester signal;

means, connected to receive the plurality of delayed signals from the first and second delaying means, for constructing a plurality of predetermined clock waveforms which differ in phase and frequency.

* * * * *